(12) United States Patent
Iwamoto et al.

(10) Patent No.: US 7,345,100 B2
(45) Date of Patent: Mar. 18, 2008

(54) WATER-BASED INK COMPOSITION FOR BALL-POINT PEN

(75) Inventors: Kiyoshi Iwamoto, Yokohama (JP); Hideaki Tomi, Ebina (JP); Yoji Takeuchi, Yokohama (JP); Masaru Miyamoto, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 273 days.

(21) Appl. No.: 10/495,228

(22) PCT Filed: Nov. 7, 2002

(86) PCT No.: PCT/JP02/11629

§ 371 (c)(1),
(2), (4) Date: May 11, 2004

(87) PCT Pub. No.: WO03/044108

PCT Pub. Date: May 30, 2003

(65) Prior Publication Data

US 2005/0143485 A1 Jun. 30, 2005

(30) Foreign Application Priority Data

Nov. 19, 2001 (JP) .............................. 2001-353211

(51) Int. Cl.
*C09D 11/18* (2006.01)
(52) U.S. Cl. ...................... 523/161; 524/500
(58) Field of Classification Search ............... 523/160, 523/161
See application file for complete search history.

(56) References Cited

U.S. PATENT DOCUMENTS

| 5,281,262 | A  |   | 1/1994  | Saito |
| 5,814,685 | A  | * | 9/1998  | Satake et al. ................ 523/201 |
| 6,040,005 | A  | * | 3/2000  | Carr et al. .................... 427/197 |
| 6,099,629 | A  | * | 8/2000  | Morita et al. ............... 106/31.6 |
| 6,306,930 | B1 |   | 10/2001 | Tsujio |
| 6,387,984 | B1 | * | 5/2002  | Ito .............................. 523/161 |
| 6,498,203 | B1 | * | 12/2002 | Kito et al. .................... 523/161 |
| 6,666,913 | B2 | * | 12/2003 | Hirano et al. ............... 106/31.9 |

FOREIGN PATENT DOCUMENTS

| EP | 0 556 668 A1 | 8/1993 |
| JP | 4-332776 A   | 11/1992 |
| JP | 2000-103997 A | 4/2000 |
| JP | 2000-136339 A | 5/2000 |
| JP | 2001-019888 A | 1/2001 |
| JP | 2001-019889 A | 1/2001 |
| JP | 2001019890    | 1/2001 |

* cited by examiner

*Primary Examiner*—Callie Shosho
(74) *Attorney, Agent, or Firm*—Buchanan Ingersoll & Rooney PC

(57) ABSTRACT

A water-based ink composition for a ballpoint pen containing at least colored resin particles which have an average particle diameter of 2 to 20 µm and which are non-thermoplastic in a proportion of 5 to 30% by weight based on the total amount of the ink composition and non-colored particles having a glass transition point of 60° C. or higher. The average particle diameter of the non-colored particles is preferably to 0.01 to 10 µm. The ink composition preferably includes at least one selected from ethylene oxide or propylene oxide adducts of glycerin and ethylene oxide or propylene oxide adducts of diglycerin in a proportion of 1 to 30% by weight based on the total amount of the ink composition.

6 Claims, No Drawings

WATER-BASED INK COMPOSITION FOR BALL-POINT PEN

TECHNICAL FIELD

The present invention relates to a water-based ink composition for a ballpoint pen which can be used for a writing instrument and which is excellent in erasability by an eraser.

BACKGROUND ART

A lot of water-based ink compositions which have erasability by an eraser has so far been proposed.

For example, disclosed in Japanese Patent Application Laid-Open No. 103997/2000 is an erasable ink composition in which a colorant contained in the ink is regulated around a certain size, that is, an erasable water-based ink composition comprising at least a colorant, wherein the above colorant has an average particle diameter of 2 μm or more, and the colorant having a particle diameter of 1.8 μm or less accounts for 1.6% by weight or less based on the colorant.

The ink composition described in the above gazette has erasability by an eraser, but it has the problems that the elimination of the colorant from a paper face only by light contact with the drawn lines so that the soiling of paper face is caused and that it does not stand actual use.

Further, disclosed in Japanese Patent Application Laid-Open No. 136339/2000 is an eraser-erasable water-based ink composition for a ballpoint pen provided with a point contact-like sticking property on the drawn lines after drying by blending particles having a glass transition point or a minimum film-forming temperature which exceeds 0° C. and is lower than 40° C. for the purpose of improving the performance of the drawn lines against abrasion. In the above ink composition, however, a film is sometimes formed depending on a temperature condition in writing, and therefore a problem resides in the points that the erasability is reduced and that starving in the beginning of writing due to film forming at a pen tip is caused, so that the eraser-erasable water-based ink composition for a ballpoint pen having stable quality is not obtained.

Further, disclosed in Japanese Patent Application Laid-Open No. 19888/2001 is an eraser-erasable water-based ink composition for a writing instrument having the purpose of improving the performance against abrasion by using adhesive colored resin particles provided with an adhesive property as a colorant. In the above water-based ink composition, however, a problem resides in the point that when writing is carried out after left standing for a certain time with the cap taken off, starving is liable to be caused, so that the good drawn lines can not be obtained.

Further, disclosed in Japanese Patent Application Laid-Open No. 19889/2001 is an eraser-erasable water-based ink composition for a writing instrument containing a colorant comprising colored thermoplastic resin particles and adhesive resin particles. The water-based ink composition using such a colorant has problems that it is liable to be instable with the passage of time and that erasability by an eraser is reduced when the drawn lines are left standing at a temperature of room temperature or higher for a certain period.

Further, in the water-based ink compositions described in the respective gazettes described above, it is not described that liquid media other than water are used. In the water-based ink compositions described in the respective gazettes described above, the colorants have to stay in the vicinity of a paper face in order to exhibit well erasability by an eraser. However, if a conventional scarcely volatile solvent blended in a lot of water-based ink compositions is used, the solvent penetrates into the inside of a paper face together with the colorant in a certain case without volatilizing, and therefore a problem resides in the point that using such a solvent is a cause by which the erasability is reduced. Accordingly, the current situation is that a water-based ink composition for a ballpoint pen which is excellent in erasability by an eraser is intensively desired to appear.

In light of the problems and the current situation of the conventional water-based ink compositions for a ballpoint pen described above having erasability by an eraser, the present invention intends to solve the above problems, and an object thereof is to provide a water-based ink composition for a ballpoint which is stable with the passage of time and which is excellent in a writing performance and erasability by an eraser.

DISCLOSURE OF THE INVENTION

Intensive investigations repeated by the present inventors in order to solve the conventional problems described above have resulted in successfully obtaining a water-based ink composition for a ballpoint pen meeting the object described above which is stable with the passage of time and which is excellent in a total performance in writing by adding a colorant which has a specific particle diameter range and which is non-thermoplastic and particles having a specific glass transition point, and thus the present invention has come to be completed.

That is, the present invention comprises in the following items (1) to (5).

(1) A water-based ink composition for a ballpoint pen characterized by comprising at least colored resin particles which have an average particle diameter of 2 to 20 μm and which are non-thermoplastic in a proportion of 5 to 30% by weight based on the total amount of the ink composition and non-colored particles having a glass transition point of 60° C. or higher.

(2) The water-based ink composition for a ballpoint pen as described in the above item (1), wherein the non-colored particles have an average particle diameter of 0.01 to 10 μm.

(3) The water-based ink composition for a ballpoint pen as described in the above item (1) or (2), further comprising at least one selected from the group consisting of ethylene oxide or propylene oxide adducts of glycerin and ethylene oxide or propylene oxide adducts of diglycerin in a proportion of 1 to 30% by weight based on the total amount of the ink composition.

(4) The water-based ink composition for a ballpoint pen as described in any of the above items (1) to (3), wherein a viscosity value at 1 rpm which is measured under the condition of 25° C. by means of an EMD type viscometer falls in a range of 100 to 1500 mPa·s.

(5) The water-based ink composition for a ballpoint pen as described in any of the above items (1) to (4), wherein a viscosity value at 100 rpm which is measured under the condition of 25° C. by means of the EMD type viscometer falls in a range of 10 to 90 mPa·s.

BEST MODE FOR CARRYING OUT THE INVENTION

The embodiment of the invention shall specifically be explained below.

The water-based ink composition for a ballpoint of the present invention is characterized by comprising at least colored resin particles which have an average particle diameter of 2 to 20 μm and which are non-thermoplastic in a proportion of 5 to 30% by weight based on the total amount of the ink composition and non-colored particles having a glass transition point of 60° C. or higher.

The colored resin particles used in the present invention comprise colored resin particles and are non-thermoplastic, and they have to be colored resin particles having an average particle diameter of 2 to 20 μm.

The colored resin particle used in the present invention includes, for example, a colored resin particle in which a colorant comprising a pigment is dispersed in a resin particle, a colored resin particle in which the surface of a resin particle is covered with a colorant comprising a pigment and a colored resin particle prepared by dying a resin particle with a colorant comprising a dye.

In the present invention, the structure (hollow or non-hollow (dense)) and the form (spherical, polygonal, flat or fibrous) of a colored resin particle shall not specifically be restricted as long as the colored resin particle is non-thermoplastic and meets the average particle diameter described above, and a spherical colored resin particle having an average particle diameter of 3 to 15 μm in which a glass transition point is 150° C. or higher and close to a thermal decomposition temperature and which has such intramolecular cross-linking that a melt flow index value is less than 0.1 and does not have an adhesive property is preferably used from the viewpoint of exhibiting excellent erasability by an eraser, a writing property and stability of the ink with the passage of time.

If the colored resin particle is thermoplastic and has an adhesive property, coagulation between the particles is liable to be caused, and the stability of the ink is damaged or starving of drawn lines is liable to be caused when a pen filled with the ink is left standing with the cap taken off. Accordingly, such a particle is not preferred.

If the colored resin particle has an average particle diameter of less than 2 μm, the particle is liable to get into a gap between paper fibers and reduced in an erasability, and therefore it is not preferred. On the other hand, if the colored resin particle has an average particle diameter of exceeding 20 μm, the erasability is enhanced, but brought about are the defects that the ink is reduced in color density and that the colored resin particle is liable to be precipitated, so that the stability with the passage of time is damaged and the feeling in writing is deteriorated. Accordingly, such a particle is not preferred.

The particles can stay in the vicinity of a paper surface without penetrating into the depth of the fibers of paper only by controlling an average particle diameter of the colored resin particles to 2 to 20 μm and using the non-thermoplastic particles, so that they can readily be removed by an eraser.

The colorant used for the colored resin particles includes, for example, direct dyes such as Aizen Primula Red 4BH and Aizen Primula Yellow GCLH (manufactured by Aizen Co., Ltd.), acidic dyes such as Aizen Bonceau RH, Aizen Opal Pink BH and Aizen Opal Black WH Extra Conc. (manufactured by Aizen Co., Ltd.), Orient Solpul Blue OBX and Orient Solpul Blue OBB (manufactured by Orient Chemical Co., Ltd.), food dyes such as Tartrazine, Acid Red and Flokiron (manufactured by Aizen Co., Ltd.) and fluorescent dyes.

The pigment includes, for example, inorganic pigments such as carbon black, titanium oxide and iron oxide, organic pigments such as phthalocyanine base pigments and azo base pigments, inorganic fluorescent pigments such as calcium sulfide and other fluorescent pigments.

The resin component includes, for example, at least one selected from polymers of acrylic acid, methacrylic acid, acrylates, methacrylates, styrene, acrylonitrile and butadiene and copolymers thereof, polyethylene, polyethylene terephthalate, polypropylene, phenol resins, epoxy resins and urethane resins, and reins subjected, if necessary, to treatment such as cross-linking may be used. Methods such as publicly known suspension polymerization and dispersion polymerization can be used as a coloring method for the above resins.

The resin component for the colored resin particle is preferably acryl resins, urethane resins and benzoguanamine resins in terms of a price and a mixing and dying property with the colorant.

The colored resin particle which does not have an adhesive property and which is not thermoplastic is preferred. An ink comprising the particle having an adhesive property is liable to cause starving when written after a pen filled with the ink is left standing for a certain time with the cap taken off, and the good drawn lines can not be obtained in a certain case. Further, the thermoplastic particle is liable to be instable with the passage of time, and the drawn lines are reduced in erasability by an eraser in a certain case when left standing for a certain period at room temperature or higher.

The colored resin particle having the characteristics described above which can be used in the present invention includes, for example, commercially available Rubcouleur 220 (M) Black (pigment-containing cross-linked PMMA particles, average particle diameter: 8.5 μm, structure: dense, form: sphere, manufactured by Dainichiseika Color & Chemicals Mfg. Co., Ltd.), Epocolor FP112 Pink (fluorescent dye-colored benzoguanamin.formaldehyde condensed product, average particle diameter: 3 to 5 μm, structure: dense, form: sphere), Epocolor FP113 Red (fluorescent dye-colored benzoguanamin.formaldehyde condensation product, average particle diameter: 3 to 5 μm, structure: dense, form: sphere), Epocolor FP114 Orange (fluorescent dye-colored benzoguanamin.formaldehyde condensation product, average particle diameter: 3 to 5 μm, structure: dense, form: sphere), Epocolor FP117 Yellow (fluorescent dye-colored benzoguanamin.formaldehyde condensation product, average particle diameter: 3 to 5 μm, structure: dense, form: sphere)(manufactured by Nippon Shokubai Co., Ltd.) and Burnock CFB-620C-40 (black, pigment-containing urethane particles, average particle diameter: 10 to 20 μm, structure: dense, form: sphere, manufactured by Dainippon Ink & Chemicals Inc.). They can be used alone or in a mixture of two or more kinds thereof.

A content of the colored resin particle having the characteristics described above is desirably 5 to 30% by weight, preferably 8 to 20% by weight based on the total amount of the ink composition.

If the above content of the colored resin particle is less than 5% by weight in the ink composition, the preferred drawn lines are not obtained, and if it exceeds 30% by weight in the ink composition, the writing feeling is heavy or starving is liable to be caused in the drawn lines in writing by a pen filled with the composition. Accordingly, such ranges are not preferred.

The non-colored particles used in the present invention are added in order to further provide both characteristics of erasability by an eraser and abrasion resistance, and the non-colored particles having a glass transition point of 60° C. or higher have to be used.

In the present invention, a weak adhesive property endowed to the particles reveals a sticking property to such extent that the erasability is not damaged by using the non-colored particles having a glass transition point of 60° C. or higher, preferably 80° C., whereby the abrasion resistance is further improved. Further, a particle diameter of the non-colored particles exerts an effect as well on the sticking property.

If the non-colored particles having a glass transition point of lower than 60° C. are used, a film of the non-colored particles is sometimes formed depending on a temperature condition in writing, and the colored resin particle, which is the colorant is brought into face contact with a paper face, so that the erasability is lowered.

The non-colored particles used in the present invention include, for example, non-colored styrene butadiene particles, styrene acryl resin particles, acrylate particles, methacrylate particles, silicone acryl particles and vinylpyridine particles, and the above non-colored particles may be modified.

The styrene butadiene particles (modified or not modified), the styrene acryl resin particles (modified or not modified), the acrylate particles (modified or not modified) and the methacrylate particles (modified or not modified) are preferably used in terms of strength of a continuous coating film, a suitable adhesive property and stability of the ink.

The above non-colored particles have an average particle diameter of preferably 0.01 to 10 μm, more preferably 0.1 to 2 μm.

If the non-colored resin particles have an average particle diameter of less than 0.01 μm, the particles are liable to get into the inner part of a gap between paper fibers, and therefore the eraser-erasing effect is less liable to be exerted. On the other hand, if the non-colored resin particles have an average particle diameter of exceeding 10 μm, the abrasion resistance is inferior. This is considered to be attributable to the facts that a contact area between the particle and a paper face is reduced and that the particle is liable to be caught by virtue of abrasion because of a size thereof.

The non-colored resin particles having the characteristics described above which can be used in the present invention include, for example, commercially available Joncryl 790 (styrene acryl particles, average particle diameter: 0.2 μm, glass transition point: 90° C., structure: dense, form: sphere), Joncryl 7640 (styrene acryl particles, average particle diameter: 0.12 μm, glass transition point: 85° C., structure: dense, form: sphere)(manufactured by Johnson Polymer Co., Ltd.), HP-433J (hollow styrene acryl resin particles, average particle diameter: 0.4 μm, glass transition point: 105° C., structure: hollow structure, form: sphere) and OP-84J (hollow styrene acryl resin particles, average particle diameter: 0.55 μm, glass transition point: 105° C., structure: hollow structure, form: sphere) (manufactured by Rohm & Haas Co., Ltd.). They can be used alone or in a mixture of two or more kinds thereof.

A content of the non-colored resin particles having the characteristics described above is preferably 0.1 to 10% by weight, more preferably 0.5 to 5% by weight based on the total amount of the ink composition.

If a content of the colored resin particles is less than 0.1% by weight, the erasability by an eraser and the abrasion resistance, which are the effects of the present invention can not be exerted. On the other hand, if it exceeds 10% by weight, the adhesive property becomes stronger so that the abrasion resistance is improved, but the erasability is notably reduced. Accordingly, both ranges are not preferred.

Water (refined water, ion-exchanged water, pure water and the like) is used as the principal solvent in the water-based ink composition for a ballpoint pen of the present invention, and a water-soluble polar solvent having a polar group which is compatible with water can further be used as the solvent in terms of providing the water holding property and improving the writing feeling.

The water-soluble polar solvent which can be used includes, for example, ethylene glycol, diethylene glycol, triethylene glycol, polyethylene glycol, propylene glycol, ethylene glycol monomethyl ether, glycerin, pyrrolidone and triethanolamine, and they can be used alone or in a mixture of two or more kinds thereof.

In the water-based ink composition for a ballpoint pen of the present invention, a water-soluble liquid medium other than water can be used. This water-soluble liquid medium includes at least one selected from the group consisting of ethylene oxide or propylene oxide adducts of glycerin and ethylene oxide or propylene oxide adducts of diglycerin, preferably diglycerin propylene oxide (4 to 30) mole adducts and diglycerin ethylene oxide (5 to 40) mole adducts.

Use of the above water-soluble liquid media makes it possible to prepare the ink composition which has better erasability by an eraser and which is excellent in drying resistance at a pen tip. From the viewpoint of improving more the erasability by an eraser and the drying resistance at a pen tip, desirably used are polyoxyethylene 13 mole-added diglyceryl ether, polyoxypropylene 9 mole-added diglyceryl ether, polyoxyethylene 10 mole-added glyceryl ether and polyoxypropylene 9 mole-added glyceryl ether.

It is estimated that the above water-soluble liquid media have the above effects because they allow the colored resin particles to stay in the vicinity of the surface of paper fibers due to a high water holding property and good "separation", though the mechanism thereof is not clear, from the colored resin particles and the non-colored resin particles.

A content of the above water-soluble liquid media is preferably 1 to 30% by weight, more preferably 5 to 15% by weight based on the total amount of the ink composition.

If a content of the water-soluble liquid media is less than 1% by weight, the erasability by an eraser and drying resistance at a pen tip can not further be exhibited. On the other hand, if it exceeds 30% by weight, a drying property of the drawn lines is reduced. Accordingly, both ranges are not preferred.

In the water-based ink composition for a ballpoint pen of the present invention, additives (optional components) which are usually used for water-based inks for a ballpoint pen can be used as a component other than those described above as long as the effects of the present invention are not damaged.

In respect to the additives, a pH controlling agent includes, ammonia, urea, monoethanolamine, diethanolamine, triethanolamine, alkali metal salts of phosphoric acid such as sodium tripolyphosphate, sodium carbonate and hydroxides of alkali metals such as sodium hydroxide, and an antiseptic agent or a fungicide includes phenol, sodium omadine, sodium pentachlorophenol, 1,2-benzisothiazoline-3-one, 2,3,5,6-tetrachloro-4-(methylsulfonyl)pyridine, alkaline metal salts of benzoic acid, sorbitan acid and dehydroacetic acid such as sodium benzoate and benzimidazole base compounds.

Further, a rust preventive includes benzotriazole, dicyclohexylammonium nitrite, diisopropylammonium nitrite, tolyl triazole and saponins, and a lubricant includes polyalkylene glycol derivatives such as polyoxyethylene lauryl ether, fatty acid alkali salts, nonionic surfactants, fluorine base surfactants such as perfluoroalkyl ether phosphoric acid esters and polyether-modified silicone such as polyethylene glycol adducts of dimethylenepolysiloxane.

The ink composition having more stability can be obtained by adding a water-soluble viscosity-controlling agent to the water-based ink composition for a ballpoint pen of the present invention.

For example, at least one selected from the group consisting of synthetic polymers, celluloses and polysaccharides can be used as the viscosity-controlling agent.

The synthetic polymers include, for example, polyacrylic acids, polyvinyl alcohol, polyethylene oxide, polyvinylpyrrolidone, polyvinyl methyl ether and polyacrylamide; the celluloses include ethyl cellulose, methyl cellulose, hydroxymethyl cellulose and carboxymethyl cellulose; and the polysaccharides include xanthan gum, guar gum, casein, gum arabic, gelatin, carrageenan, alginic acid, tragacanth gum and locust bean gum.

In the water-based ink composition for a ballpoint pen of the present invention, a viscosity value at 1 rpm which is measured under the condition of 25° C. by means of an EMD type viscometer is desirably controlled to a range of preferably 100 to 1500 mPa·s, more preferably 500 to 1200 mPa·s by suitably adding the viscosity-controlling agent described above and the like.

Controlling of this viscosity value at 1 rpm to a range of 100 to 1500 mPa·s makes it possible to prepare an ink which does not cause separation with the passage of time and which has a good writing feeling.

Further, the viscosity value at 100 rpm which is measured under the condition of 25° C. by means of the EMD type viscometer is desirably controlled to a range of preferably 10 to 90 mPa·s, more preferably 20 to 50 mPa·s.

Controlling of this viscosity value at 100 rpm to a range of 10 to 90 mPa·s makes it possible to obtain good drawn lines which do not cause starving.

The water-based ink composition for a ballpoint pen of the present invention can be produced by blending the colored resin particles having the characteristics described above, the non-colored resin particles, water (and the water-soluble polar solvent), the water-soluble liquid medium and the additives in the same manner as in a production process for a publicly known water-based ink.

The water-based ink composition for a ballpoint pen of the present invention has a pH which is controlled to 7.0 to 9.0 by a pH controlling agent in terms of usability, safety, corrosion resistance against a metal part of a ballpoint pen and a thickening power when using an alkali thickening type thickener.

A water-based ballpoint pen filled with the water-based ink composition for a ballpoint pen of the present invention shall not specifically be restricted in a structure thereof and the like, and a ballpoint pen having a publicly known ballpoint pen structure using a water-based ink can be used.

Estimated as follows is the reason why the water-based ink composition for a ballpoint pen of the present invention is excellent in erasability by an eraser and abrasion resistance of the drawn lines.

In the present invention, a particle diameter of the colored resin particle used as the colorant has been controlled to a range of 2 to 20 μm, and therefore the particles stay in the vicinity of the surface of paper without damaging the stability of the ink composition with the passage of time and the feeling in writing and getting into the depth of fibers of the paper, so that they can readily be removed with an eraser. Also, because the colored resin particle is non-thermoplastic, the erasability is not reduced, and the ink itself becomes excellent as well in stability with the passage of time. Further, the particle scarcely has an adhesive property and the great part of the particles is removed from a paper face with erasing, and therefore the drawn lines can be erased well by an eraser as compared with those written with an ink comprising conventional colorant particles having an adhesive property.

In the present invention, a weak adhesive property endowed to the particles results in revealing a sticking property to such extent that the erasability is not damaged by adding the non-colored particles having a glass transition point of 60° C. or higher, whereby the abrasion resistance is further improved. Further, even if the temperature condition in writing fluctuates to a high temperature or a low temperature, the film of the non-colored particles is not formed, and the erasability is not reduced.

Accordingly, in the water-based ink composition for a ballpoint pen of the present invention, provided is a water-based ink composition for a ballpoint pen which is stable with the passage of time and which is excellent in a writing performance, erasability by an eraser and abrasion resistance.

Further, in the present invention, a water-based ink composition for a ballpoint pen which has good erasability by an eraser and which is excellent in drying property at a pen tip is provided by further adding at least one selected from the group consisting of ethylene oxide or propylene oxide adducts of glycerin and ethylene oxide or propylene oxide adducts of diglycerin in a proportion of 1 to 30% by weight based on the total amount of the ink composition.

EXAMPLES

Next, the present invention shall be explained in more details with reference to examples and comparative examples, but the present invention shall not be restricted to the following examples.

Examples 1 to 4 and Comparative Examples 1 to 5

The respective water-based ink compositions (pH 8.3) for a ballpoint pen were prepared according to blend formations shown in the following Table 1.

The water-based ink compositions obtained in the respective examples and comparative examples were measured for viscosities at 1 rpm and 100 rpm under the condition of 25° C. according to the following method by means of an EMD type viscometer.

Measuring Method of Viscosity:

Measured under the condition described above by means of VISCOMETER BE11OR (manufactured by Toki Sangyo Co., Ltd.).

The water-based ink compositions obtained in the respective examples and comparative examples were filled into an ink reservoir of a ballpoint pen (uni-ball Signo, manufactured by Mitsubishi Pencil Co., Ltd.) having the following structure.

Ink reservoir: form: cylinder, inner diameter: 4.0 mm, made of polypropylene, length: 115 mm Ball diameter: 0.7 mm, ball material: hard metal The respective water-based ballpoint pens thus obtained were evaluated for erasability by an eraser, abrasion resistance with a finger, stability of the ink with the passage of time, starving in the beginning of writing, drawn line erasability after left standing at 40° C. for one month (1 M), drawn line density and drawn line quality by the following evaluating methods.

The results thereof are shown in the following Table 1.

(1) Evaluating Method of Erasability by an Eraser

Circles having a diameter of about 2 cm were helically written on a writing paper meeting an ISO standard by means of the respective pens, and after one minute passed, the drawn lines were erased by an eraser (EP-60, manufactured by Mitsubishi Pencil Co., Ltd.).

This test was carried out under the environment of 25°0 C. and 60% RH and evaluated according to the following criteria.

Evaluation Criteria:

⊚: the drawn lines are finely erased by the eraser

○: a part of the drawn lines remains a little as compared with ⊚ described above Δ: a part of the drawn lines remains as compared with ⊚ described above ΔΔ: the drawn lines are erased a little by the eraser, but a large part thereof remains without being erased x: drawn lines are not erased by the eraser (2) Evaluating Method of Abrasion Resistance with a Finger Twenty circles having a diameter of about 2 cm were helically written on a writing paper meeting the ISO standard by means of the respective pens, and after one minute passed, the drawn lines were lightly abraded five times with a finger.

This test was carried out under the environment of 25° C. and 60% RH and evaluated according to the following criteria.

Evaluation Criteria:

⊚: the drawn lines abraded with a finger are not erased and have good abrasion resistance ○: abrasion resistance is a little inferior as compared with ⊚ described above Δ: abrasion resistance is inferior as compared with ⊚ described above ΔΔ: the drawn lines abraded with a finger are almost erased x: the drawn lines abraded with a finger are totally erased (3) Evaluating Method of Stability of the Ink with the Passage of Time A bottle of 15 ml with a cover made of glass was charged with each ink obtained above and tightly sealed, and then it was stored under the condition of 50° C. for one month. Further, the separating states of the respective inks were visually observed, and the viscosity values at the initial time and after time passed were measured as well under the same conditions as described above and evaluated according to the following criteria.

Evaluation Criteria:

⊚: separation and coagulation are not caused, and the ink has a change of viscosity values at 1 rpm and 100 rpm falling within ±5% in comparison with those at the initial time and has good stability with the passage of time ○: separation and coagulation are not caused, and the ink has a change of viscosity values at 1 rpm and 100 rpm falling within ±10% in comparison with those at the initial time and has good stability with the passage of time Δ: separation and coagulation are not caused, and the ink has a change of viscosity values at 1 rpm and 100 rpm falling within ±15% in comparison with those at the initial time has good stability with the passage of time ΔΔ: separation or coagulation is slightly caused x: separation or coagulation is caused (4) Evaluating Method of Starving in the Beginning of Writing The respective pens were left standing horizontally for 3 minutes under the environment of 25° C. and 60% RH with the caps taken off, and then writing was carried out on a writing paper meeting the ISO standard and evaluated according to the following criteria.

Evaluation Criteria:

⊚: good without causing starving in the beginning of writing

○: starving is observed a little

Δ: starving of 1 cm long or less is observed

ΔΔ: starving of 3 cm long or less is observed x: starving is observed beyond 3 cm long (5) Evaluating Method of Drawn Line Erasability After Left Standing at 40° C. for One Month Twenty circles having a diameter of about 2 cm were helically written on a writing paper meeting the ISO standard by means of the respective pens, and the drawn lines thus obtained were stored under the conditions of 40° C. and 55% RH. After one month passed, the drawn lines were erased by the eraser. (EP-60, manufactured by Mitsubishi Pencil Co., Ltd.) and evaluated according to the following criteria.

Evaluation Criteria:

⊚: the drawn lines are finely erased by the eraser even after left standing at 40° C. for one month ○: a part of the drawn lines slightly remains as compared with ⊚ described above Δ: a part of the drawn lines remains as compared with ⊚ described above ΔΔ: the drawn lines are slightly erased by the eraser, but a large part thereof is not erased and remains x: the drawn lines are not erased by the eraser (6) Evaluating Method of Drawn Line Density Twenty circles having a diameter of about 2 cm were helically written on a writing paper meeting the ISO standard by means of the respective pens and evaluated according to the following criteria.

Evaluation Criteria:

⊚: density of the drawn lines is good

○: a little light

Δ: density of about 70% of ⊚

ΔΔ: light x: remarkably light (7) Evaluating Method of Drawn Line Quality

Circles having a diameter of about 5 cm were helically written on a writing paper meeting the ISO standard in about 100 m in terms of a straight line distance by means of the respective pens and evaluated according to the following criteria (writing conditions: writing speed: 4.5 m/minute, writing angle: 60° and writing load: 100 g).

Evaluation Criteria:

⊚: good o: starving is caused at 5 portions or less

Δ: starving is caused at 10 portions or less

ΔΔ: starving is caused at 15 portions or less x: starving is caused in excess of 15 portions

TABLE 1

| | Example | | | | Comparative Example | | | | |
|---|---|---|---|---|---|---|---|---|---|
| | 1 | 2 | 3 | 4 | 1 | 2 | 3 | 4 | 5 |
| Colored resin particles: A-1 ‡1 | 15 | | | | 15 | | | | |
| A-2 ‡2 | | 12 | | | | 1 | | | |
| A-3 ‡3 | | | 20 | 20 | | | | | |
| A-4 ‡4 | | | | | | | 40 | 15 | |
| A-5 ‡5 | | | | | | | | | 15 |
| Non-colored particles: B-1 ‡6 | | 3 | | | | | | | |
| B-2 ‡7 | 5 | | 4 | 4 | 5 | 5 | 5 | 5 | 5 |
| Water-soluble liquid medium: | | | | | | | | | |
| Polyoxyethylene 13 mol-adduct of diglyceryl ether | 8 | | 10 | | 8 | 8 | 8 | 8 | |
| Polyoxyethylene 9 mol-adduct of diglyceryl ether | | 7 | | | | | | | 6 |
| Water-soluble polar solvent: | | | | | | | | | |
| Glycerin | | | | 10 | | | | | |
| Viscosity-controlling agent: | | | | | | | | | |
| Xanthan gum ‡8 | 0.18 | | | | 0.18 | 0.28 | 0.12 | 0.18 | |
| Polyacrylic acids A ‡9 | | 0.38 | | | | | | | 0.32 |
| Polyacrylic acids B ‡10 | | | 0.36 | 0.36 | | | | | |
| pH-controlling agent: | | | | | | | | | |
| Triethanolamine | 1.2 | 1.5 | 1.4 | 1.4 | 1.2 | 1.2 | 1.2 | 1.2 | 1.5 |
| Rust preventive: benzotriazole | 0.5 | 0.5 | 0.5 | 0.5 | 0.5 | 0.5 | 0.5 | 0.5 | 0.5 |
| Water (refined water) | 70.12 | 75.62 | 63.74 | 63.74 | 75.12 | 84.02 | 45.18 | 70.12 | 71.68 |
| EMD type viscosity (25° C.): | | | | | | | | | |
| 1 rpm (mPa · s) | 678 | 819 | 785 | 720 | 623 | 703 | 633 | 744 | 866 |
| 100 rpm (mPa · s) | 42 | 53 | 53 | 48 | 44 | 46 | 48 | 48 | 60 |
| Erasability by an eraser | ⊚ | ⊚ | ⊚ | ○ to Δ | ⊚ | ⊚ | Δ | ΔΔ | Δ |
| Abrasion resistance with finger | ○ | ⊚ | ○ | ⊚ | X | ○ | Δ | ⊚ | ○ |
| Stability of the ink with the passage of time | ⊚ | ⊚ | ⊚ | ⊚ | ⊚ | ⊚ | ΔΔ | ⊚ | Δ |
| Starving in the beginning of writing | ⊚ | ⊚ | ⊚ | ○ | ○ | ⊚ | Δ | ○ | Δ |
| Drawn line erasability after left standing at 40° C. for 1 M | ⊚ | ○ | ⊚ | ○ to Δ | ⊚ | ⊚ | Δ | ⊚ | Δ |
| Drawn line density | ⊚ | ⊚ | ⊚ | ⊚ | ⊚ | X | ⊚ | ⊚ | ⊚ |
| Drawn line quality | ⊚ | ⊚ | ⊚ | ⊚ | ⊚ | ○ | ΔΔ | ⊚ | ⊚ |

‡1 to ‡10 in Table 1 show the following:
‡1: Rubcouleur 220 (M) Black (pigment-containing cross-linked PMMA particles, average particle diameter: 8.5 µm, structure: dense, form: sphere, manufactured by Dainichiseika Color & Chemicals Mfg. Co., Ltd.)
‡2: Epocolor FP112 Pink (fluorescent dye-colored benzoguanamin · formaldehyde condensation product, average particle diameter: 3 to 5 µm, structure: dense, form: sphere, manufactured by Nippon Shokubai Co., Ltd.)
‡3: Burnock CFB-620C-40 (black, pigment-containing urethane particles, average particle diameter: 10 to 20 µm, structure: dense, form: sphere, manufactured by Dainippon Ink & Chemicals Inc.)
‡4: pigment-containing cross-linked methyl methacrylate particles (blue, average particle diameter: 1 µm, glass transition point: 105° C., structure: dense, form: sphere)
‡5: pigment-containing particles comprising cross-linked PMMA/BA/ethylene glycol dimethacrylate = 70/25/5 (red, average particle diameter: 5.6 µm, glass transition point: 40° C., structure: dense, form: sphere)
‡6: Joncryl 790 (styrene acryl particles, average particle diameter: 0.2 µm, glass transition point: 90° C., structure: dense, form: sphere, manufactured by Johnson Polymer Co., Ltd.)
‡7: HP-433J (hollow styrene acryl resin particles, average particle diameter: 0.4 µm, glass transition point: 105° C., structure: hollow structure, form: sphere, manufactured by Rohm & Haas Co., Ltd.)
‡8: Kelzan RD (manufactured by Sansho Co., Ltd.)
‡9: Jurymer PW-111 (manufactured by Nihon Junyaku Co., Ltd.)
‡10: Hiviswako #105 (manufactured by Wako Pure Chemical Industries, Ltd.)

As apparent from the results shown in Table 1 described above, it has become clear that the ink compositions prepared in Examples 1 to 4 falling in the scope of the present invention are excellent in erasability by an eraser, abrasion resistance with a finger and stability with the passage of time and do not have starving in the beginning of writing as compared with those prepared in Comparative Examples 1 to 5 falling outside the scope of the present invention and that they are excellent as well in drawn line erasability after left standing at 40° C. for one month and are so excellent that they can satisfy all of performances such as drawn line density and drawn line quality.

Observing individually the comparative examples, Comparative Example 1 is a case where the non-colored particles are not contained; Comparative Example 2 is a case where a content of the colored resin particles is small; Comparative Example 3 is a case where a content of the colored resin particles is large; Comparative Example 4 is a case where the colored resin particles have a small average particle diameter; and Comparative Example 5 is a case where adhesive colored resin particles are used. It can be found that in the above cases, incapable of being satisfied are all of the performances such as erasability by an eraser, abrasion resistance with a finger, stability of the ink with the passage of time, starving in the beginning of writing, drawn line erasability after left standing at 40° C. for one month, drawn line density and drawn line quality.

INDUSTRIAL APPLICABILITY

The water-based ink composition for a ballpoint pen of the present invention is stable with the passage of time, and it is excellent in a writing performance, erasability by an eraser and abrasion resistance.

Also, the ink composition containing at least one selected from ethylene oxide or propylene oxide adducts of glycerin and ethylene oxide or propylene oxide adducts of diglycerin in a proportion of 1 to 30% by weight based on the total amount of the ink composition has a better erasability by an eraser and is excellent in drying resistance at a pen tip.

Further, the ink composition in which a viscosity value at 1 rpm measured under the condition of 25° C. by means of an EMD type viscometer falls in a range of 100 to 1500 mPa·s and/or a viscosity value at 100 rpm falls in a range of 10 to 90 mPa·s is excellent in stability and writing performance.

What is claimed is:

1. A water-based ink composition for a ballpoint pen comprising at least colored resin particles which have an average particle diameter of 2 to 20 μm and which are non-thermoplastic and do not have an adhesive property in a proportion of 5 to 30% by weight based on the total amount of the ink composition and non-colored particles having a glass transition point of 60° C. or higher and having an average particle diameter of 0.01 to 10 μm in a proportion of 0.5 to 5% by weight based on the total amount of the ink composition, wherein a viscosity value at 1 rpm which is measured under the condition of 25° C. by means of an EMD viscometer falls in a range of 100 to 1500 mPa·s.

2. The water-based ink composition for a ballpoint pen as described in claim 1, wherein a viscosity value at 100 rpm which is measured under the condition of 25° C. by means of the EMD viscometer falls in a range of 10 to 90 mPa·s.

3. A water-based ink composition for a ballpoint pen comprising at least colored resin particles which have an average particle diameter of 2 to 20 μm and which are non-thermoplastic and do not have an adhesive property in a proportion of 5 to 30% by weight based on the total amount of the ink composition, non-colored particles having a glass transition point of 60° C. or higher and having an average particle diameter of 0.01 to 10 μm in a proportion of 0.5 to 5% by weight based on the total amount of the ink composition, and at least one selected from the group consisting of ethylene oxide or propylene oxide adducts of glycerin and ethylene oxide or propylene oxide adducts of diglycerin in a proportion of 1 to 30% by weight based on the total amount of the ink composition, wherein a viscosity value at 1 rpm which is measured under the condition of 25° C. by means of an EMD viscometer falls in a range of 100 to 1500 mPa·s.

4. The water-based ink composition for a ballpoint pen as described in claim 3, wherein a viscosity value at 100 rpm which is measured under the condition of 25° C. by means of the EMD viscometer falls in a range of 10 to 90 mPa·s.

5. A water-based ink composition for a ballpoint pen comprising at least colored resin particles which have an average particle diameter of 2 to 20 μm and which are non-thermoplastic and do not have an adhesive property in a proportion of 5 to 30% by weight based on the total amount of the ink composition and non-colored particles having a glass transition point of 60° C. or higher and having an average particle diameter of 0.01 to 10 μm in a proportion of 0.5 to 5% by weight based on the total amount of the ink composition, wherein a viscosity value at 100 rpm which is measured under the condition of 25° C. by means of the EMD viscometer falls in a range of 10 to 90 mPa·s.

6. A water-based ink composition for a ballpoint pen comprising at least colored resin particles which have an average particle diameter of 2 to 20 μm and which are non-thermoplastic and do not have an adhesive property in a proportion of 5 to 30% by weight based on the total amount of the ink composition, non-colored particles having a glass transition point of 60° C. or higher and having an average particle diameter of 0.01 to 10 μm in a proportion of 0.5 to 5% by weight based on the total amount of the ink composition, and at least one selected from the group consisting of ethylene oxide or propylene oxide adducts of glycerin and ethylene oxide or propylene oxide adducts of diglycerin in a proportion of 1 to 30% by weight based on the total amount of the ink composition, wherein a viscosity value at 100 rpm which is measured under the condition of 25° C. by means of the EMD viscometer falls in a range of 10 to 90 mPa·s.

* * * * *